United States Patent
Ferris

(10) Patent No.: US 6,711,885 B2
(45) Date of Patent: Mar. 30, 2004

(54) GROUND-FOLLOWING LAWN MOWER CUTTER DECK SUSPENSION SYSTEM

(76) Inventor: Joseph Ferris, 215 Church St., Oneida, NY (US) 13126

(*) Notice: Subject to any disclaimer, the term of this patent is extended or adjusted under 35 U.S.C. 154(b) by 0 days.

(21) Appl. No.: 09/820,060

(22) Filed: Mar. 28, 2001

(65) Prior Publication Data

US 2001/0013217 A1 Aug. 16, 2001

(51) Int. Cl.[7] .............................................. A01D 34/03
(52) U.S. Cl. ..................................................... 56/15.8
(58) Field of Search ........................... 56/15.6, 15.7, 56/15.8, 16.7, 17.5, DIG. 3, DIG. 10, DIG. 22; 280/124.179, 124.136, 124.141

(56) References Cited

U.S. PATENT DOCUMENTS

| | | | |
|---|---|---|---|
| 3,672,696 A | 6/1972 | Akgulian et al. ............. 280/15 |
| 3,696,594 A | * 10/1972 | Freimuth et al. ............ 56/15.2 |
| 3,785,672 A | 1/1974 | Shakespear ............. 280/112 A |
| 3,940,161 A | 2/1976 | Allison ...................... 280/96.2 |
| 4,325,211 A | 4/1982 | Witt et al. .................... 56/15.8 |
| 5,355,665 A | 10/1994 | Peter ........................... 56/15.8 |
| 5,367,864 A | * 11/1994 | Ogasawara et al. .......... 56/15.8 |
| 5,381,647 A | 1/1995 | Eberle ........................ 56/15.8 |
| 5,820,147 A | 10/1998 | Rhweder et al. ......... 280/93.51 |
| 5,946,893 A | 9/1999 | Gordon ....................... 56/15.8 |
| 5,956,932 A | 9/1999 | Schmidt ..................... 56/15.6 |
| 6,170,242 B1 | 1/2001 | Gordon ....................... 56/15.8 |

OTHER PUBLICATIONS

Ferris Industries, "NewZ's"; sales brochure that includes the Latest in Suspension Technology, 6 pages. (No date).

* cited by examiner

Primary Examiner—Robert E. Pezzuto
(74) Attorney, Agent, or Firm—Brown & Michaels, PC

(57) ABSTRACT

An improved lawn mower includes a chassis assembly having one or more drive wheels, a ground-following cutter deck assembly attached to the chassis, and rolling mechanism attached to the cutter deck, wherein the chassis and the cutter deck are arranged such that the rolling mechanism and the drive wheels support the chassis for movement over a surface. The ground-following cutter deck thereby reacts to the ground contours independent of the reactions of the chassis, and the combined weight of the chassis and cutter deck keep the cutter deck from bouncing, thus, the ground-following cutter deck follows the ground contours evenly.

20 Claims, 6 Drawing Sheets

GROUND-FOLLOWING LAWN MOWER CUTTER DECK SUSPENSION SYSTEM

BACKGROUND OF THE INVENTION

1. Field of the Invention

The invention pertains to the field of lawn mowers. More particularly, the invention pertains to a lawn mower wherein the lawn mower chassis rests on top of a ground-following lawn mower cutter deck.

2. Description of Related Art

A typical lawn mower chassis and a typical ground-following cutter deck of the prior art each include supports holding the chassis and cutter deck in relation to the ground. Typically, these supports are wheels, but they optionally comprise rollers, skids, or other suitable support means. One problem in the prior art is that such a combination of conventional elements generally does not maintain an even grass cut, due to the up and down vertical motion inherent in such systems. In particular, chassis roll and pitch and cutter deck bouncing can affect adversely the evenness of the grass cut.

FIG. 1 shows a typical ground-following lawn mower cutter deck of the prior art. This design has a cutter deck frame 3 from which cutter deck 10 hangs. Cutter deck 10 includes deck wheels 9 and a deck lift assembly that includes deck lift mechanism 16, chains or cables (not shown), and deck lift linkages 5. Deck lift mechanism 16 is what the operator physically actuates to lift the cutter deck, for example, when not mowing. Typically, the cutting height adjustment is made after the deck lift mechanism has been actuated and the cutter deck is in its upward position. Each of the foregoing parts are common in prior art designs for adjusting and maintaining the lawn mower's cutting height. However, typical lawn mowers of the prior art can also include other conventional designs. For example, the wheels can be mounted directly from the cutter deck and cantilevered from that position (not shown), or the cutter deck 10 can be connected to the chassis frame 2 through the use of cutter deck pusher bars 15, or other similar conventional means. A conventional chassis frame 2 is typically one of the main components of the lawn mower. In many cases, chassis frame 2 is the structure to which most of the other parts of the lawn mower are attached. The prior art lawn mower typically has three to four wheels that support its weight and allow for its movement over a surface, such as the lawn being cut. Typically, all parts having to do with the lawn mower's speed and direction are attached to the chassis frame.

FIGS. 2 and 3 illustrate a typical riding lawn mower, comprising a lawn or garden tractor and a ground-following cutter deck attached to its chassis frame, such that they operate as one machine. FIG. 2 shows a typical lawn/garden tractor of the prior art with a prior art ground-following lawn mower deck 10 attached to the tractor's chassis frame 2. Rear wheels 7 are typically the drive wheels, which dictate the forward and reverse motion and speed of the vehicle. Mounted to the front of chassis frame 2 are chassis steering wheels 17, comprising steering means for turning the vehicle. The ground-following cutter deck 10 is attached by arms 18 to chassis frame 2, such that cutter deck 10 responds to the ground contours independently of chassis response to ground contours. Cutter deck 10 is supported by deck wheels 9.

FIG. 3 shows a typical zero turning-radius lawn mower of the prior art, comprising a ground-following cutter deck attached to chassis frame 2. Rear wheels 7 are typically the drive wheels, which dictate the forward and reverse motion and speed of the vehicle. Mounted to the front of chassis frame 2 are chassis support wheels 19, which are merely chassis supports (i.e., not steering means). The ground-following cutter deck assembly is located behind chassis support wheels 19. Cutter deck height adjustment and attachment are accomplished via conventional means, which are well known in the art. Cutter deck 10 is supported by deck wheels 9 mounted to cutter deck frame 3. The entire cutter deck assembly is then connected to chassis frame 2 by radius rods 8, which transfer speed and direction from the chassis. Cutter deck 10 responds to ground contours independently of chassis response to the ground contours.

The combination of a ground-following cutter deck and a conventional lawn mower chassis, be it a tractor or a zero turning radius lawn mower (as described above), allows both components to interact with the surface contours of the ground, independently of each others' reactions to ground surface contours. However, in the prior art designs, the cutter deck can bounce and thereby fail to follow the ground contours. In attempts to solve this problem, some prior art lawnmowers have been designed such that the cutter deck hangs directly from the chassis frame, whereby the cutter deck responds directly to chassis movement, rather than to the ground contours. Such designs are typically referred to in the art as a "floating deck" design, because the cutter deck "floats" over the ground surface, as opposed to a ground-following deck, which typically rolls over the ground.

However, the floating deck design does not completely resolve the common problems with ground-following cutter decks, and the floating deck has its own inherent problems. More particularly, floating deck designs can result in an uneven grass cut, when uneven or bumpy ground contours cause the chassis, from which the floating deck hangs, to move up and down vertically, and pitch and roll, thereby causing the floating deck also to move up and down, and pitch and roll, thus resulting in an uneven grass cut.

SUMMARY OF THE INVENTION

Briefly stated, an improved lawn mower design includes a chassis assembly having one or more drive wheels, a ground-following cutter deck assembly attached to the chassis, and rolling means attached to the cutter deck, wherein the chassis and the cutter deck are arranged such that the rolling or sliding means and the drive wheels support the chassis for movement over a surface. The ground-following cutter deck thereby reacts to the ground contours independent of the reactions of the chassis, and the combined weight of chassis and cutter deck keep the deck from bouncing, thus, the ground-following cutter deck follows the ground contours evenly.

DETAILED DESCRIPTION OF THE INVENTION

One problem with prior art lawn mowers is that the typical combinations of conventional elements generally do not maintain evenness of the grass cut. In particular, chassis roll and pitch and cutter deck bouncing can affect adversely the evenness of the grass cut by prior art lawn mowers. The present invention addresses the problems of chassis roll and pitch and cutter deck bouncing, which undesirably change the elevation of the cutter deck with respect to the lawn being cut, thereby resulting in an uneven grass cut. The present invention further offers the benefits of being easily produced and enabling an increased mowing speed over prior art lawn mowers.

The invention is a unique combination and refinement of conventional technologies used in lawn mowers. It comprises, in its most basic form, a ground-following cutter deck with a lawn mower chassis resting upon it, via a suspension system. Thus, by putting the weight of the chassis on top of the ground-following cutter deck, the common problems in prior art lawn mowers of chassis roll and pitch and cutter deck bouncing are alleviated. To add weight to the cutter deck, in one embodiment of the invention, the third and fourth chassis wheels, which are typically the front steering wheels, are removed. The entire cutter deck assembly thereby functions substantially as an axle of the lawn mower (e.g., the lawn/garden tractor), and its up and down movement is independent of chassis up and down action. The front wheels of the ground-following cutter deck thus also function as wheels for steering the lawn mower, or, alternatively, simply as support means for the chassis. In addition, when the front chassis wheels are thus eliminated from the prior art lawn mower chassis, the overall length of the lawn mower is thereby decreased, which facilitates turning the lawn mower and mowing in tight spaces. A further advantage of the present invention is that the cutter deck and the chassis respond independently of each others' reactions to ground contours. Thus, the cutter deck is able to follow the contours of the terrain, without reacting to chassis up and down motion, and without bouncing, thereby providing a more even grass cut. Preferably, a suspension system is located between the cutter deck and the chassis.

Figure 1:
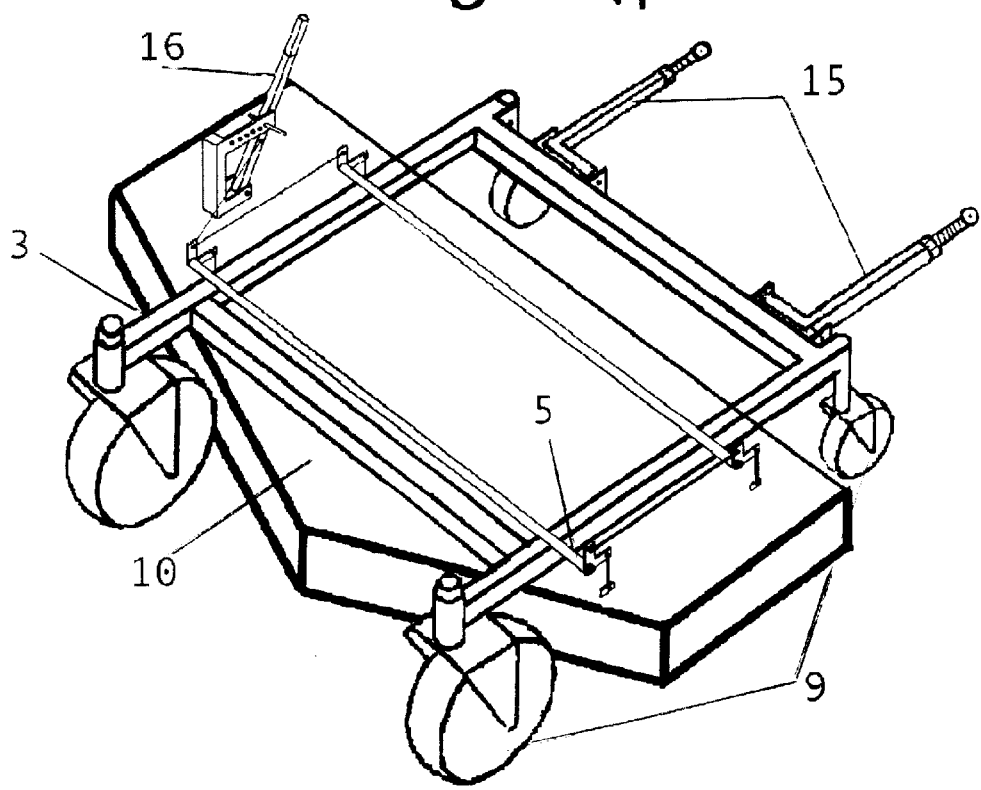
FIG. 1 shows a typical ground-following lawn mower cutter deck of the prior art.
Figure 2:
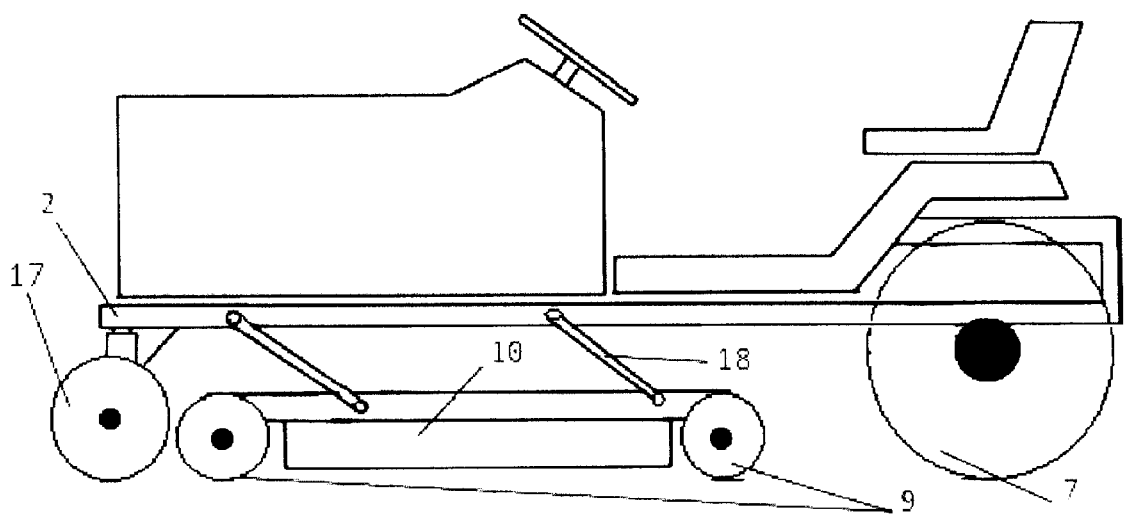
FIG. 2 shows a typical lawn/garden tractor with a ground-following lawn mower cutter deck attached to its chassis, according to the prior art.
Figure 3:
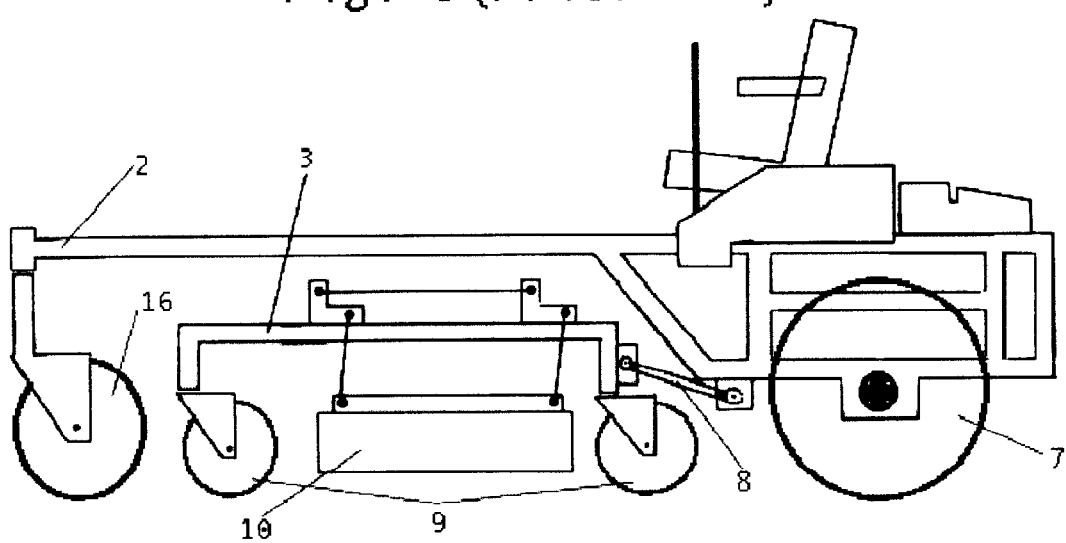
FIG. 3 shows a typical zero turning-radius lawn mower of the prior art.
Figure 4:
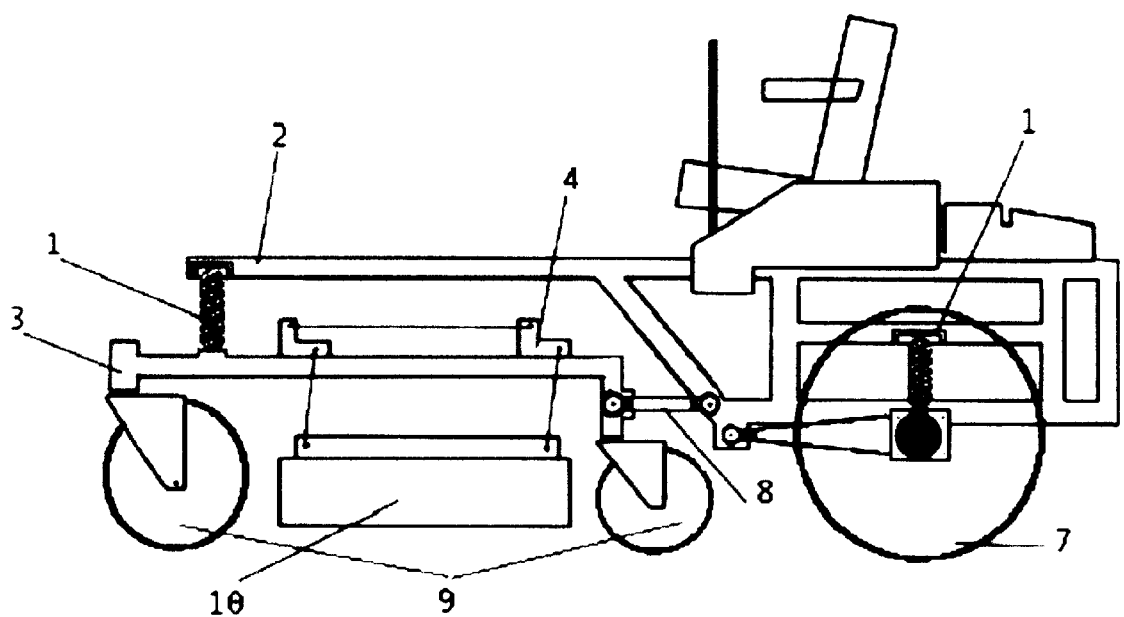
FIG. 4 shows a zero turning-radius lawn mower, according to an embodiment of the present invention.

FIG. 4 shows a zero turning-radius lawn mower, according to an embodiment of the present invention. In this example, chassis frame 2 rests on suspension springs 1, and cutter deck frame 3, in turn, is located under front suspension spring 1. Thus, partial weight of the chassis is put onto the cutter deck assembly located below. The cutter deck assembly is attached by conventional means that are well known in the art, such as, for example, radius rods 8, which preferably have pivoting end links that allow the cutter deck assembly to respond to ground contours independently of chassis action in response to ground contours. Thus, the cutter deck assembly functions substantially as an axle of the lawn mower. Springs 1 and linkages between the chassis and cutter deck assembly allow the cutter deck and the chassis to interact with the ground surface independent of each other. The overall length of the lawn mower is decreased as well.

Figure 5:
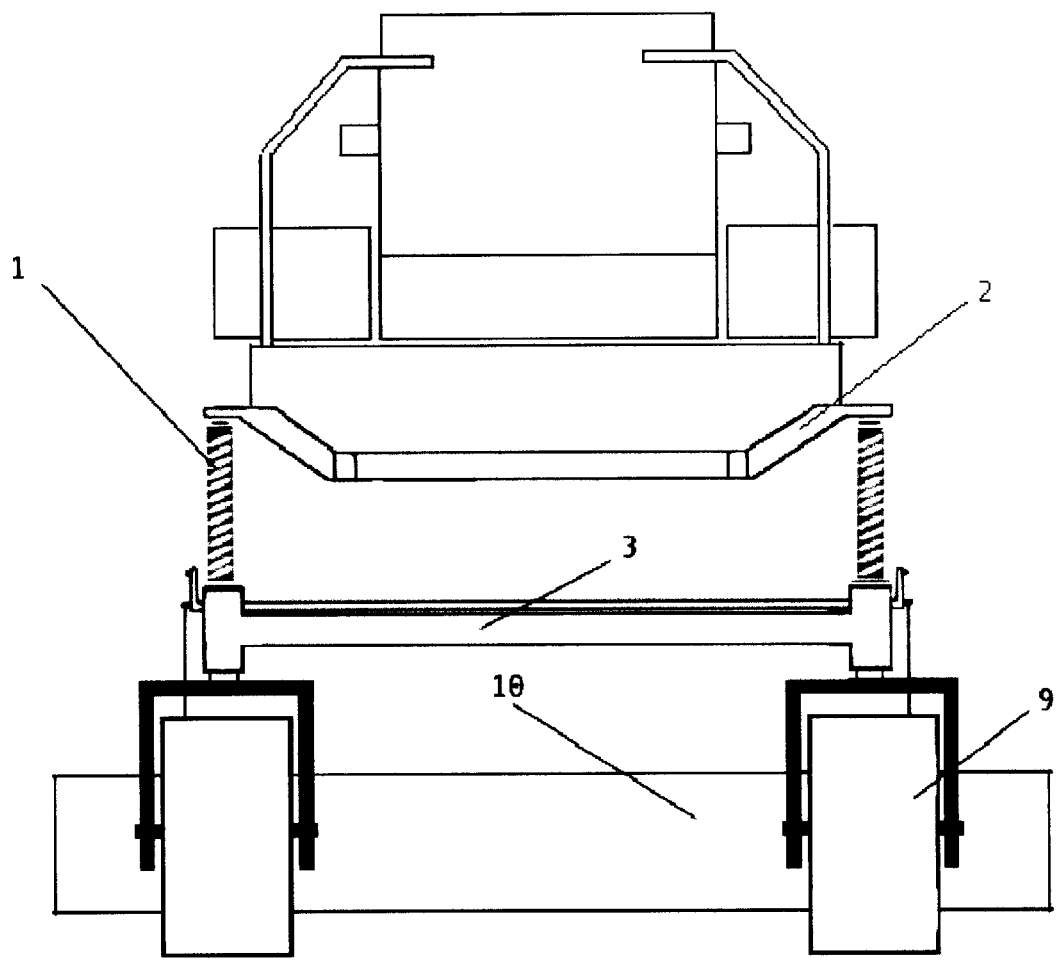
FIG. 5 shows a front view of an embodiment of the lawn mower suspension system of the present invention.

FIG. 5 shows an embodiment of the lawn mower suspension system of the present invention, viewed from the ground level perspective. In this example, the weight of chassis frame 2 rests on front suspension spring 1. Spring 1, in turn, rests on cutter deck frame 3 of the ground-following cutter deck assembly, and deck wheels 9 mount to the cutter deck frame 3.

Figure 6:
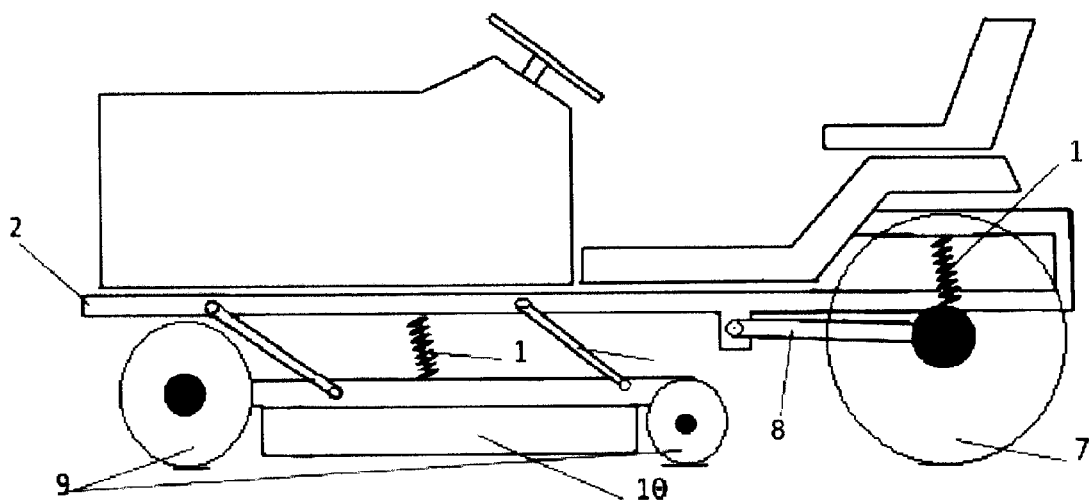
FIG. 6 shows a lawn/garden tractor with a ground-following lawn mower cutter deck attached to its chassis, according to the present invention.

FIG. 6 shows a lawn/garden tractor with a ground-following mower deck attached to its chassis, according to the present invention. Chassis frame 2 rests on cutter deck 10, through suspension spring 1. The front deck wheels 9 on the cutter deck function to steer the lawn mower, via mechanisms that are well known in the art. The weight of the chassis allows the ground-following deck to follow the contours of the ground, without bouncing. The overall length of the lawn mower is also decreased, which facilitates turning the lawn mower and mowing in tight spaces.

One of ordinary skill in the art can see how the invention can be applied to other styles of lawn mowers. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A lawn mower, comprising:
   a) a chassis assembly having one or more drive wheels;
   b) a ground-following cutter deck assembly attached to said chassis;
   c) rolling or sliding means attached to said cutter deck, wherein said rolling or sliding means is selected from the group consisting of:
      i) wheels;
      ii) rollers;
      iii) skids; and
      iv) any combination of i–iii above; and
   wherein said chassis and said cutter deck are arranged such that said rolling or sliding means and said drive wheels support said chassis for movement over a surface.

2. The lawn mower of claim 1, further comprising means for lifting said cutter deck.

3. The lawn mower of claim 1, wherein each drive wheel is independently powered.

4. The lawn mower of claim 1, wherein each drive wheel is not independently powered.

5. The lawn mower of claim 1, further comprising a suspension system.

6. The lawn mower of claim 5, wherein said suspension system comprises one or more spring means between said chassis and said drive wheels.

7. The lawnmower of claim 6, wherein said spring means is selected from the group consisting of:
   a) a coil spring;
   b) a leaf spring; and
   c) a torsion bar.

8. The lawn mower of claim 5, wherein said suspension system comprises one or more spring means between said chassis and said cutter deck assembly.

9. The lawnmower of claim 8, wherein said spring means is selected from the group consisting of:
   a) a coil spring;
   b) a leaf spring; and
   c) a torsion bar.

10. The lawn mower of claim 1, wherein each drive wheel is capable of moving vertically up and down, substantially independently of vertical movement of an opposing drive wheel.

11. The lawn mower of claim 1, wherein each drive wheel is capable of moving vertically up and down, but not independently of vertical movement of an opposing drive wheel.

12. The lawn mower of claim 1, wherein said cutter deck substantially functions as an axle means.

13. The lawn mower of claim 12, wherein said cutter deck is capable of moving vertically up and down, substantially independently of vertical movement of said chassis.

14. The lawn mower of claim 1, wherein said rolling means substantially functions as a steering means.

15. The lawn mower of claim 1, wherein said cutter deck and said chassis are capable of responding substantially independently of each others' reactions to ground contours.

16. The lawn mower of claim 6, further comprising means for adjustably precompressing said spring means.

17. The lawn mower of claim 8, further comprising means for adjustably precompressing said spring means.

18. The lawn mower of claim 1, further comprising means for adjusting a cutting height of said cutter deck.

19. A lawn mower, comprising:

a) a chassis assembly;

b) one or more drive wheels operably connected to said lawn mower;

c) a ground-following cutter deck assembly attached to said chassis; and d) one or more wheels, rollers or skids attached to said cutter deck, wherein said chassis and said cutter deck are arranged such that said one or more wheels, rollers or skids and said drive wheels support said chassis for movement over a surface.

20. The lawn mower of claim 19, wherein said one or more drive wheels are attached to said cutter deck assembly.

* * * * *